(12) United States Patent
Akasaka

(10) Patent No.: US 11,506,916 B2
(45) Date of Patent: Nov. 22, 2022

(54) DUAL POLARIZATION OPTICAL PUMPING

(71) Applicant: FUJITSU LIMITED, Kawasaki (JP)

(72) Inventor: Youichi Akasaka, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/227,085

(22) Filed: Apr. 9, 2021

(65) Prior Publication Data

US 2022/0326553 A1    Oct. 13, 2022

(51) Int. Cl.
*G02F 1/01* (2006.01)
*H04B 10/25* (2013.01)
*H04B 10/66* (2013.01)
*H04B 10/532* (2013.01)

(52) U.S. Cl.
CPC .......... *G02F 1/0136* (2013.01); *H04B 10/25* (2013.01); *H04B 10/532* (2013.01); *H04B 10/66* (2013.01)

(58) Field of Classification Search
None
See application file for complete search history.

(56) References Cited

U.S. PATENT DOCUMENTS

| | | | | |
|---|---|---|---|---|
| 9,490,930 | B2* | 11/2016 | Bianciotto | H04B 10/2916 |
| 2005/0220161 | A1* | 10/2005 | Bolshtyansky | H04B 10/532 372/69 |
| 2009/0041472 | A1* | 2/2009 | Kawanishi | H04B 10/5563 398/187 |
| 2014/0079394 | A1* | 3/2014 | Xie | H04B 10/532 398/184 |
| 2018/0267340 | A1* | 9/2018 | Rohde | G02F 1/225 |

\* cited by examiner

*Primary Examiner* — David W Lambert
(74) *Attorney, Agent, or Firm* — Maschoff Brennan

(57) ABSTRACT

According to an aspect of an embodiment, operations may include receiving a light wave and generating a pumping wave by performing polarization modulation on the light wave based on a bit stream. The pumping wave may include a first polarization component having a first polarization and a second polarization component having a second polarization and having a same wavelength as the first polarization component. The operations may also include emitting the pumping wave in an optical medium such that the pumping wave amplifies an optical signal propagating within the optical medium.

16 Claims, 6 Drawing Sheets

DUAL POLARIZATION OPTICAL PUMPING

FIELD

The embodiments discussed herein are related to dual polarization optical pumping.

BACKGROUND

Telecommunications systems, cable television systems and data communication networks use optical networks to convey information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network. Further, optical pumping may be used to amplify optical signals that propagate through optical networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving a light wave and generating a pumping wave by performing polarization modulation on the light wave based on a bit stream. The pumping wave may include a first polarization component having a first polarization and a second polarization component having a second polarization and having a same wavelength as the first polarization component. The operations may also include emitting the pumping wave in an optical medium such that the pumping wave amplifies an optical signal propagating within the optical medium.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical networks may include nodes that may be configured to communicate information to each other via optical signals carried by optical fibers. The optical signals may be generated by modulating one or more beams of light with the information such that the beams of light operate as carrier waves (also referred to as "carriers") of the information. Any suitable modulation scheme may be used to encode the information including, any suitable polarization multiplexed or dual-polarization modulation scheme such as a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.).

Further, optical pumping may be used to amplify optical signals that propagate within an optical network. As disclosed in the present disclosure, dual-polarization pumping may be performed in a manner that may simplify amplification of dual-polarization signals. For example, the dual-polarization pumping of the present disclosure may utilize fewer components than current dual-polarization pumping schemes. Additionally or alternatively, as discussed in further detail below, the dual-polarization pumping of the present disclosure may allow for a single wavelength pump for both polarizations, whereas other dual-polarization pumping schemes may utilize two different pumps having two different wavelengths in which each pump corresponds to one of the polarizations.

Embodiments of the present disclosure will be explained with reference to the accompanying drawings.

Figure 1A:
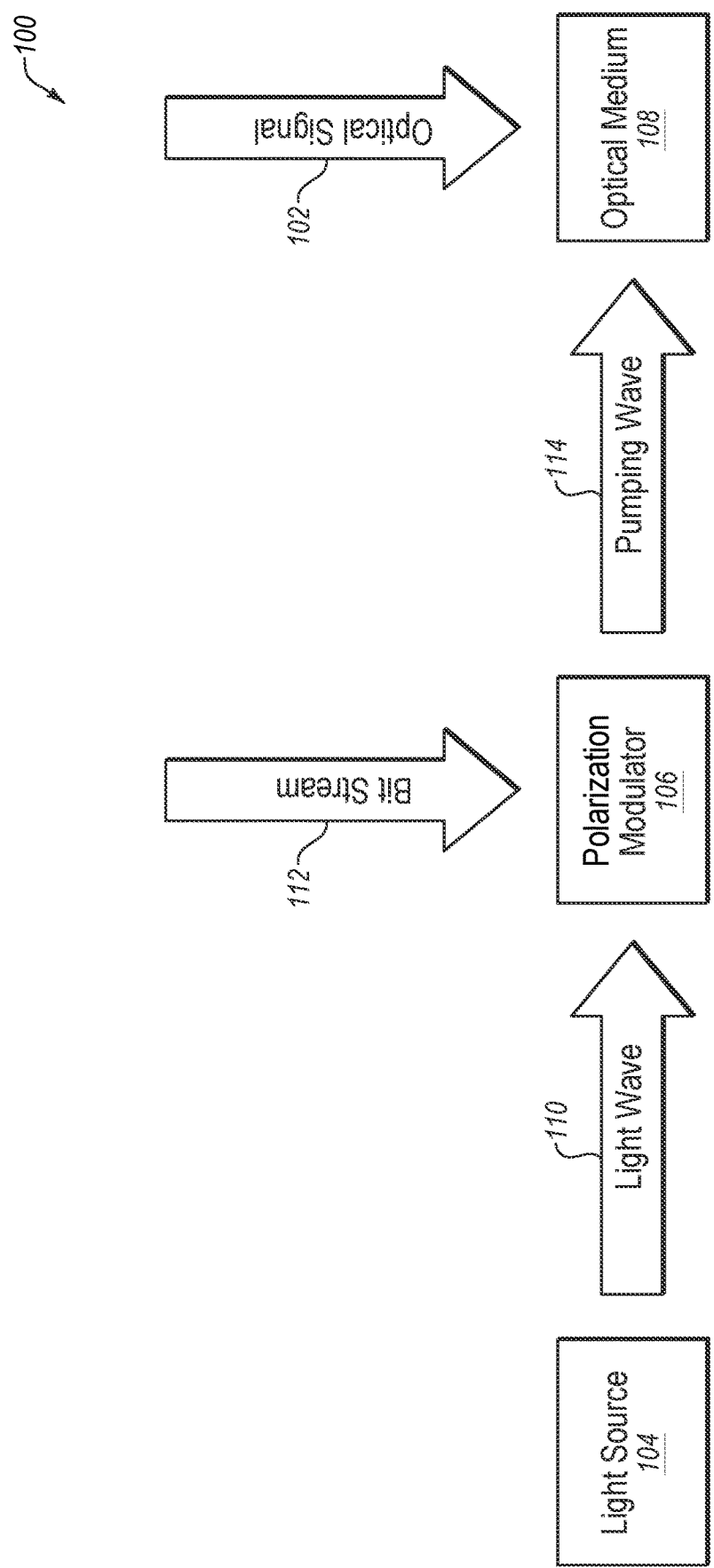
FIG. 1A illustrates an example embodiment of an optical system configured to perform dual-polarization pumping.

FIG. 1A illustrates an example embodiment of an optical system 100 ("system 100") configured to perform dual-polarization pumping, arranged in accordance with at least some embodiments of the present disclosure. In general, the system 100 may be configured to amplify an optical signal 102, that may be propagating through an optical network. In some embodiments, the system 100 may be included in any suitable optical device. For example, the system 100 may be included in any suitable optical amplifier configured to apply a gain to the optical signal 102.

The optical network may be any suitable optical network including a point-to-point optical network with terminal nodes, a ring optical network, a mesh optical network, or any other suitable optical network or combination of optical networks. For example, the optical network may include nodes that are configured to communicate information to each other via the optical signal 102 transmitted through optical fibers.

The optical signal 102 may be generated by modulating one or more beams of light with a data stream of information. Any suitable modulation scheme may be used to encode the information including any suitable polarization multiplexed or dual-polarization modulation scheme such as a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.). As such, in some embodiments, the optical signal 102 may include a dual-polarization optical signal.

Figure 1B:
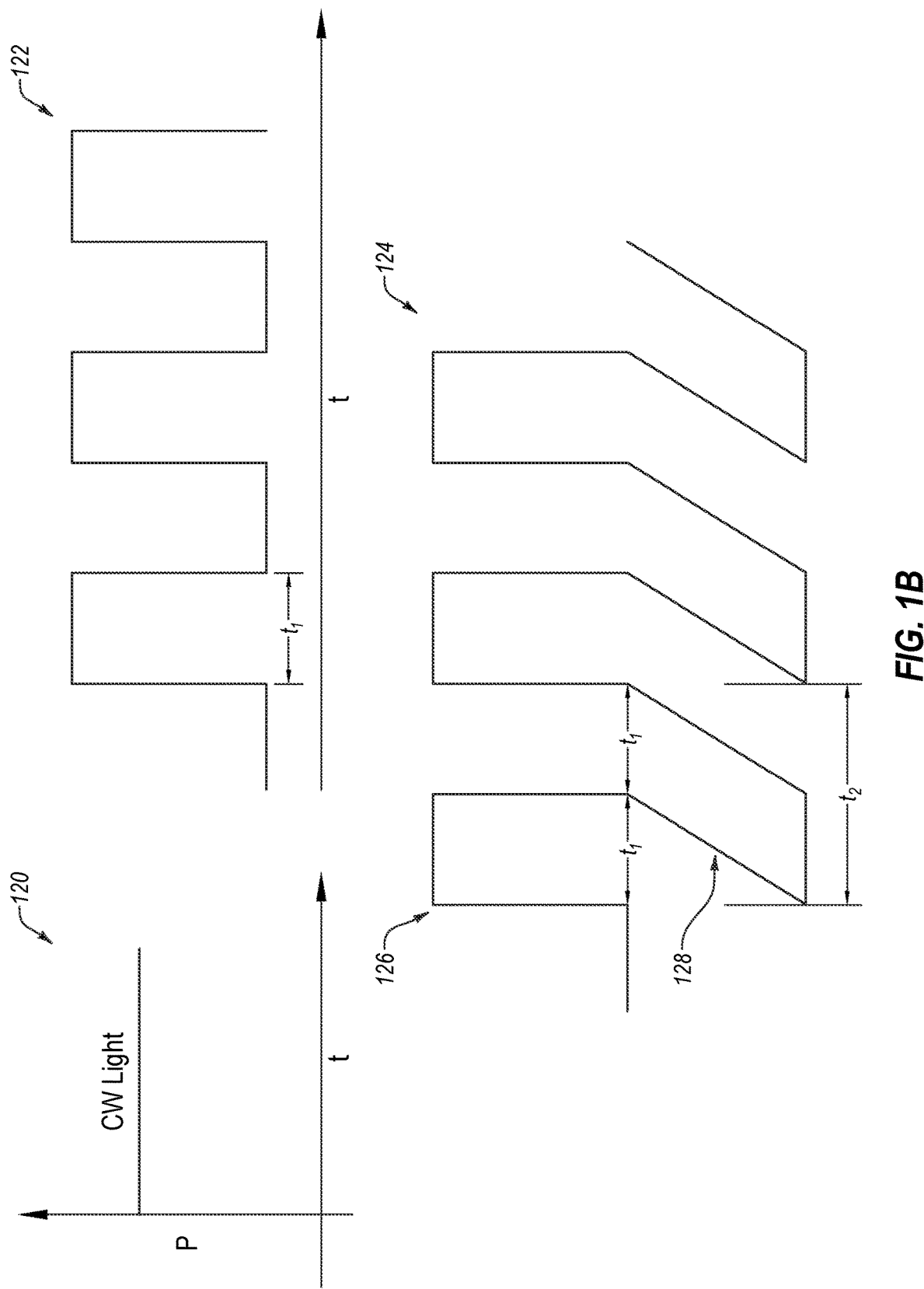
FIG. 1B illustrates an example light wave, bit stream, and pumping wave of FIG. 1A.

The system 100 may include a light source 104 configured to generate a light wave 110. The light source 104 may include a pump laser configured to generate the light wave 110. Further, the light source 104 may be configured generate the light wave 110 as a continuous wave light wave. Additionally or alternatively, the light source 104 may be configured to generate the light wave 110 as a single wavelength wave of light. FIG. 1B illustrates a wave 120 that represents an example of the light wave 110 as a continuous wave, single wavelength, light wave. The wave 120 represents an example of the light wave 110 in the time domain in which the x-axis represents time and the y-axis represents signal power of the light wave 110.

Figure 2:
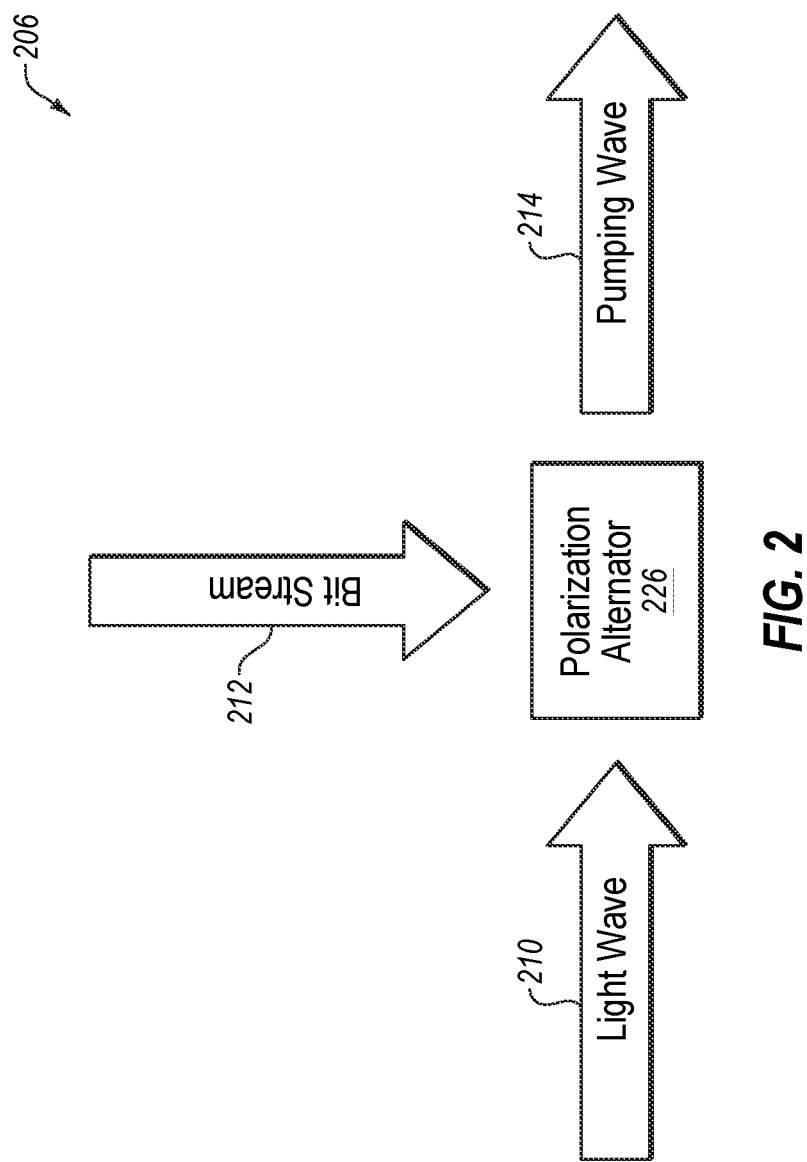
FIG. 2 illustrates an example embodiment of a polarization modulator.
Figure 3:
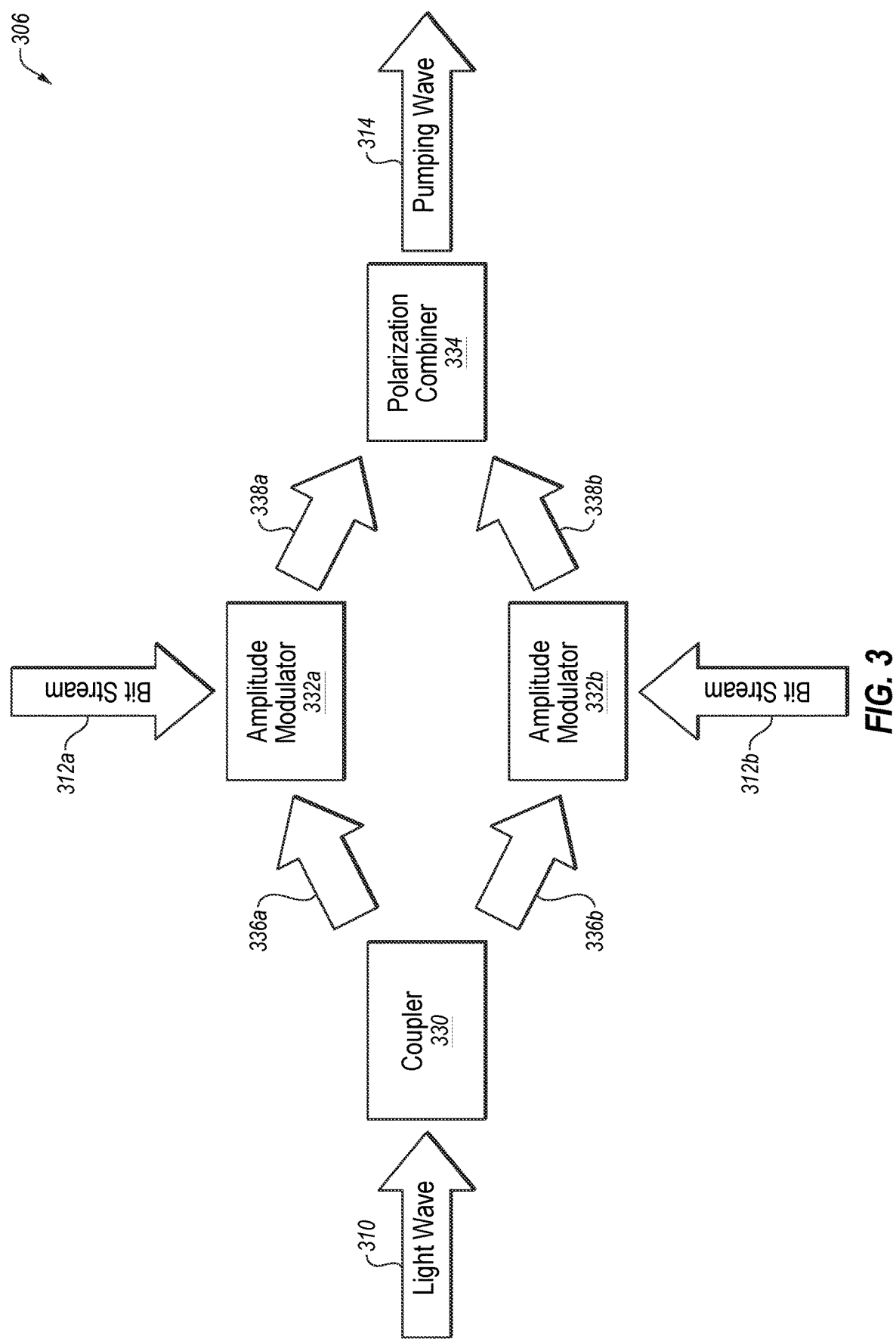
FIG. 3 illustrates another example embodiment of a polarization modulator.

The system 100 may include a polarization modulator 106. The polarization modulator 106 may include any suitable system, apparatus, or device that may be configured to receive the light wave 110 and a bit stream 112. Further, the polarization modulator 106 may be configured to perform polarization modulation on the light wave 110 based on the bit stream 112 to generate a pumping wave 114. FIGS. 2 and 3 described below include example embodiments of the polarization modulator 106.

The bit stream 112 may include a signal that carries a stream of bits with values that are represented by a digital "1" or a digital "0". In some embodiments, a period of each bit of the bit stream 112 may be half of a period (or duration) of a signal pulse of the optical signal 102 or less than half of the period of the signal pulse. Further, the bit stream 112 may be different from the data stream that is modulated on and carried by the optical signal 102.

In some embodiments, the values of the bits of the bit stream 112 may alternate between "1" and "0" every bit period such that the pattern of the bit stream 112 may be "1010101 . . . ". FIG. 1B illustrates an example stream 122 of the bit stream 112 in which the bit period is "t1" and in which the values of the bits of the bit stream 112 alternate between "1" and "0" every bit period. Further, in some embodiments, the bit period "t1" may be half of the period of the signal pulse of the optical signal 102.

Returning to FIG. 1A, the polarization modulation performed by the polarization modulator 106 may generate a pumping wave 114. The pumping wave 114 may include a first polarization component that has a first polarization. Further, the pumping wave 114 may include a second polarization component that has a second polarization. The second polarization may be different from the first polarization. For example, in some embodiments, the first and second polarizations may be orthogonal to each other.

The polarization of the pumping wave 114 may be based on the bit values of the bit stream 112. For example, in some embodiments, a bit value of "1" may correspond to the pumping wave 114 having the first polarization and a bit value of "0" may correspond to the pumping wave 114 having the second polarization, or vice versa. FIGS. 2 and 3 described below provide further detail and examples of generation of the pumping wave 114 based on the light wave 110 and the bit stream 112.

In these or other embodiments, the signal power of the first polarization component and the second polarization component may be offset from each other such that the first polarization component and the second polarization component may have a phase shift with respect to each other. For example, the pumping wave 114 may alternate between the first polarization and the second polarization such that the signal power of the pumping wave 114 alternates between the first polarization component and the second polarization component. The alternating signal power may accordingly offset the first polarization component and the second polarization component by a phase shift of 180 degrees. Additionally or alternatively, the offset and corresponding phase shift may be based on a bit period of the bit stream 112. For example, the first polarization component and the second polarization component may be offset by the bit period of the bit stream, which may correspond to a phase shift of 180 degrees in some instances.

Further, in some embodiments, the signal power of each of the first polarization component and the second polarization component may be 50% or approximately 50% of the signal power of the light wave 110. In these or other embodiments, the signal power of the light wave 110 may accordingly be at least double a target power level of each of the first polarization component and the second polarization component.

FIG. 1B illustrates an example wave 124 of the pumping wave 114. The wave 124 may be generated based on the stream 122 and the wave 120 of FIG. 1B. The wave 124 may include a first polarization component 126 and a second polarization component 128. The first polarization component 126 and the second polarization component 128 may respectively correspond to first and second polarizations, which may be orthogonal to each other.

The signal power of the wave 124 may alternate between the first polarization and the second polarization every "t1" seconds such that the first polarization component 126 and the second polarization component may be offset from each other by "t1" seconds. In some embodiments, and as discussed above, "t1" may correspond to the bit period of the stream 122. Additionally or alternatively, the signal power of the wave 124 may alternate between the first polarization and the second polarization according to the bit values of the stream 122, such as illustrated. In these or other embodiments, the total period "t2" of each of the first polarization component 126 and the second polarization component 128—in other words the amount of time between the rising edges (or between the falling edges) of the first polarization component 126 and between the rising edges (or between the falling edges) of the second polarization component 128—may be double the time "t1." In these or other embodiments, "t2" may correspond to the duration of the signal pulses of the optical signal 102. In some instances, alternating between the first polarization and the second polarization according to the time signal pulse duration"t2" such as described above may be such that a signal pulse that only includes one polarization may experience some pump as caused by the wave 124 (e.g., may be pumped during half of its duration).

Returning to FIG. 1A, the pumping wave 114 may be emitted to an optical medium 108, which may also be configured to receive the optical signal 102. In some embodiments, the optical medium 108 may include a multiplexer configured to combine the pumping wave 114 and the optical signal 102 such that the pumping wave 114 may amplify the optical signal 102. Additionally or alternatively, the optical medium 108 may include an optical fiber configured to receive the optical signal 102, as amplified by the pumping wave 114. In these or other embodiments, the optical fiber may include an optical fiber doped with other materials that may emphasize amplification with respect to specific bandwidths.

The amount of gain applied to the optical signal 102 by the pumping wave 114 may correspond to the individual power levels of the first polarization component and the second polarization component. Additionally, as indicated above, the signal power of each of the first polarization component and the second polarization component may be 50% or approximately 50% of the signal power of the light wave 110. As such, to achieve a target gain applied to the optical signal 102 that corresponds to a first signal power of the first polarization component and the second polarization component, the light wave 110 may have a second signal power that is double or approximately double the first signal power.

Therefore, as described above, the system 100 may be configured to generate the pumping wave 114 as a dual-polarization, single wavelength, pumping wave through polarization modulation. The generation of the pumping wave 114 in this manner may reduce a number of components used to perform dual-polarization pumping. For example, the polarization modulation may result in a suppression of Stimulated Brillion Scattering (SBS), which may remove a need for phase modulation for SBS suppression.

Modifications, additions, or omissions may be made to FIGS. 1A and 1B without departing from the scope of the present disclosure. For example, the system 100 may include more elements than those explicitly illustrated and/or described. Additionally, the different elements of the system 100 may be organized into a same device or two or more different devices. Further, the waveforms illustrated in FIG. 1B are for illustrative purposes only and are not meant to necessarily depict the exact shapes of the waveforms.

FIG. 2 illustrates an example embodiment of a polarization modulator 206, according to one or more embodiments of the present disclosure. The polarization modulator 206 may be an example of the polarization modulator 106 of FIG. 1A. The polarization modulator 206 may include a polarization alternator 226 configured to alternate a polarization of a light wave 210 according to a bit stream 212 to generate a pumping wave 214. The light wave 210, bit stream 212, and pumping wave 214 may be analogous to the light wave 110, bit stream 112, and pumping wave 114, respectively, of FIG. 1A.

The polarization alternator 226 may include any suitable system, apparatus, or device configured to perform polarization modulation of an optical wave based on a received input, such as an electrical input. For example, the polarization alternator 226 may include one or more electro-optic crystals that are configured to change a polarization of a received optical wave based on the electrical input (e.g. based on voltage levels of the electrical input).

For instance, the bit stream 212 may be provided to the polarization alternator 226 as an electrical signal having the bits of the bit stream 212 encoded thereon and the light wave 210 may be the received optical wave. The voltage levels of the bit stream 212 may vary based on the values of the bits of the bit stream 212. For example, a first voltage level of the bit stream 212 may correspond to a first bit value (e.g., "1" or "0") and a second voltage level of the bit stream 212 may correspond to a second bit value. The electro-optic crystals may be configured to change the polarization of the light wave 210 to a first polarization in response to the bit stream 212 having the first voltage. Additionally, the electro-optic crystals may be configured to change the polarization of the light wave 210 to a second polarization in response to the bit stream 212 having the second voltage.

Therefore in some embodiments, the changing bit values of the bit stream 212 may dictate a change in the polarization of the light wave 210 by the electro-optic crystals, which may accordingly generate the pumping wave 214 having the first polarization component and the second polarization component.

Modifications, additions, or omissions may be made to FIG. 2 without departing from the scope of the present disclosure. For example, the polarization alternator 226 may include more elements than those explicitly illustrated and/or described. Additionally, or alternatively, the polarization alternator 226 may include one or more other or additional suitable elements that may change the polarization of the light wave 210 based on the bit value of the bit stream 212.

FIG. 3 illustrates an example embodiment of a polarization modulator 306, according to one or more embodiments of the present disclosure. The polarization modulator 306 may be an example of the polarization modulator 106 of FIG. 1A. The polarization modulator 306 may include a coupler 330, a first amplitude modulator 332a, a second amplitude modulator 332b, and a polarization combiner 334.

The coupler 330 may be configured to receive a light wave 310, which may be analogous to the light wave 110 of FIG. 1A. The coupler 330 may include any suitable, system, apparatus, or device configured to split the light wave 310 into a first wave 336a and a second wave 336b. For example, the coupler 330 may include a fiber optic coupler in which an optical fiber that receives the light wave 310 splits into two optical fibers that carry the first wave 336a and the second wave 336b.

The first amplitude modulator 332a may be configured to receive the first wave 336a and the second amplitude modulator 332b may be configured to receive the second wave 336b. Each of the first amplitude modulator 332a and the second amplitude modulator 332b (referred to collectively or generally as "amplitude modulators 332") may be configured to receive a bit stream 312a and a bit stream 312b, respectively. In some embodiments, the bit streams 312 may be analogous to the bit stream 112 of FIG. 1A. Additionally or alternatively, in some embodiments the bit streams 312a and 312b may be the same but may be offset from each other by one bit period of the bit streams 312. As such, the bit streams 312a and 312b may have a 180 degree phase shift with respect to each other. In these or other embodiments, the bit streams 312a and 312b may be identical to each other.

The amplitude modulators 332 may include any suitable system, apparatus, or device, configured to perform amplitude modulation of an optical wave based on a received input, such as an electrical input. For example, the amplitude modulators 332 may include one or more electro-optic crystals and polarizers that are configured to change an amplitude of a received optical wave based on the electrical input (e.g. based on voltage levels of the electrical input).

For instance, the bit streams 312 may be respectively provided to the amplitude modulators 332 as an electrical signal having the bits of the bit streams 312 encoded thereon and the waves 336 may be the respective received optical waves. The voltage levels of the bit streams 312 may vary based on the values of the bits of the bit stream 312. For example, a first voltage level of the bit streams 312 may correspond to a first bit value (e.g., "1" or "0") and a second voltage level of the bit streams 312 may correspond to a second bit value. The amplitude modulators 332 may be configured to change the respective amplitudes of the waves 336 to a first level in response to the bit streams 312 respectively having the first voltage. Additionally, the amplitude modulators 332 may be configured to change the respective amplitudes of the waves 336 to a second level in response to the bit streams 312 respectively having the second voltage.

The amplitude modulation may be such that the first amplitude modulator 332a may output a first amplitude modulated wave 338a, which may include the first wave 336a having the bit stream 312a modulated thereon. Similarly, the amplitude modulation may be such that the second amplitude modulator 332b may output a second amplitude modulated wave 338b, which may include the second wave 336b having the bit stream 312b modulated thereon.

As indicated above, in some embodiments, the bit stream 312a may be offset from the bit stream 312b by a bit period. As such, in these embodiments, the first modulated wave 338a and the second modulated wave 338b may be offset from each other by the bit period due to the offset in the bit streams 312a and 312b. Additionally or alternatively, as also indicated above, the bit streams 312a and 312b may be identical to each other. In these or other embodiments, the first amplitude modulator 332a may be configured to induce a delay in the first wave 338a by one bit period—or alternatively the second amplitude modulator 332b may be configured to induce a delay in the second wave 338b by one bit period. The induced delay may be such that the first modulated wave 338a and the second modulated wave 338b may be offset from each other by the bit period.

The polarization combiner 334 may be configured to receive the first modulated wave 338a and the second modulated wave 338b. Further, the polarization combiner 334 may include any suitable system, apparatus, or device, configured to cause the first modulated wave 338a to have a first polarization and configured to cause the second modulated wave 338b to have a second polarization, which may be orthogonal to the first polarization in some embodiments. For example, the polarization combiner 334 may include a first polarizing filter configured to receive the first modulated wave 338a and configured to filter out all polarizations except for the first polarization. Therefore, the first polarizing filter may change the polarization of the first modulated wave 338a into the first polarization.

Additionally or alternatively, the polarization combiner 334 may include a second polarization filter configured to receive the second modulated wave 338b and configured to filter out all polarizations except for the second polarization. Therefore, the second polarizing filter may change the polarization of the second modulated wave 338b into the second polarization.

In these or other embodiments, the polarization combiner 334 may include an optical coupler configured to combine the first modulated wave 338a and the second modulated wave 338b after the respective polarizing of the first modulated wave 338a and the second modulated wave 338b to generate a pumping wave 314. The pumping wave 314 may be analogous to the pumping wave 114 of FIG. 1A in which the first modulated wave 338a forms the first polarization component of the pumping wave 314 and the second modulated wave 338b forms the second polarization component of the pumping wave 314.

Therefore in some embodiments, the splitting of the light wave 310, the amplitude modulation of the resulting waves 336 based on the bit streams 312a and 312b, and the polarizing and combining of the modulated waves 338 may accordingly generate the pumping wave 314 having the first polarization component and the second polarization component.

Modifications, additions, or omissions may be made to FIG. 3 without departing from the scope of the present disclosure. For example, the polarization modulator 306 may include more elements than those explicitly illustrated and/or described.

Figure 4:
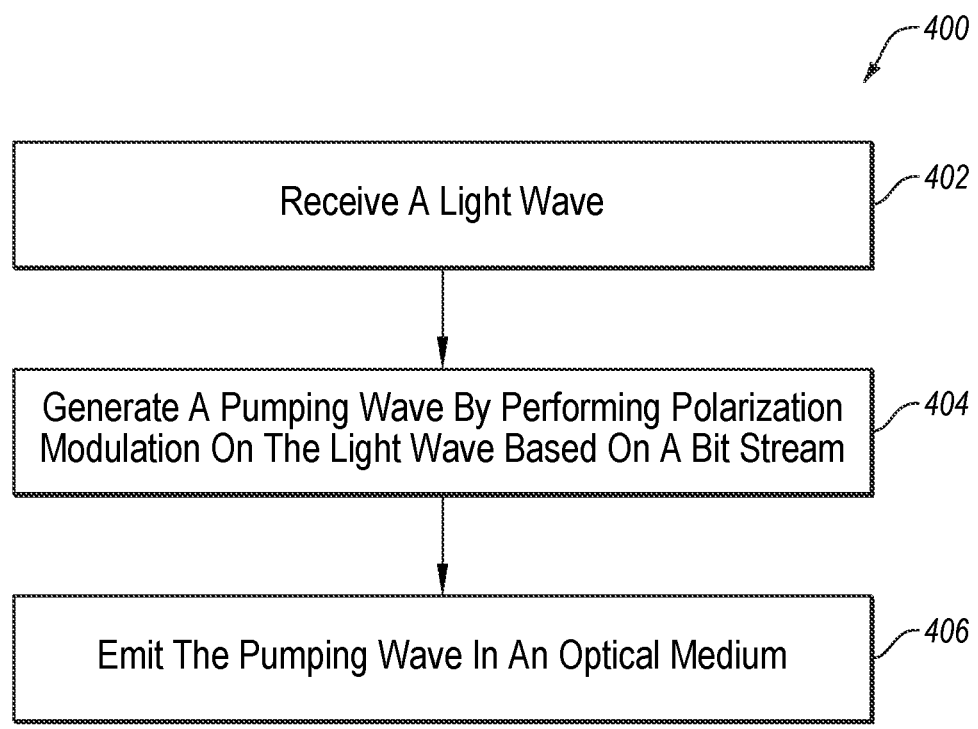
FIG. 4 is a flow chart of an example method of performing dual-polarization pumping.

FIG. 4 is a flow chart of an example method 400 of performing dual-polarization pumping, arranged in accordance with at least some embodiments of the present disclosure. The method 400 may be implemented by any suitable optical pumping system such as the polarization modulators 106, 206, and 306 respectively described above with respect to FIGS. 1A, 2, and 3. Although illustrated as discrete steps, various steps of the method 400 may be divided into additional steps, combined into fewer steps, or eliminated, depending on the desired implementation. Additionally, the order of performance of the different steps may vary depending on the desired implementation.

The method 400 may include a block 402, at which a light wave may be received by a polarization modulator. For example, a light wave such as those described with respect to FIGS. 1A, 1B, 2, and 3 may be received. In some embodiments, the light wave may be generated by a light source as part of block 402.

At block 404, a pumping wave may be generated based on the light wave. In these or other embodiments, the pumping wave may be generated based on bit values of a bit stream. In some embodiments, the pumping wave may be generated by performing polarization modulation on the light wave. The pumping wave may accordingly include a first polarization component having a first polarization and a second polarization component having a second polarization. The pumping waves of FIGS. 1A, 1B, 2, and 3 are examples of the pumping wave that may be generated. Further, the bit streams of FIGS. 1A, 1B, 2, and 3 are examples of the bit stream that may be used to generate the pumping wave. Further, the pumping wave may alternate between the first polarization and the second polarization based on the bit values to create the first polarization component and the second polarization component. The pumping wave may be generated in any suitable manner. For example, in some embodiments, the pumping wave may be generated such as described above with respect to FIG. 1A, 2, or 3.

At block 406, the pumping wave may be emitted in an optical medium such that the pumping wave amplifies an optical signal propagating within the optical medium. For example, the pumping wave may be multiplexed with the optical signal such as described above with respect to FIG. 1A. Further, the optical signal may be analogous to the optical signal 102 described above with respect to FIG. 1A.

Modifications, additions, or omissions may be made to the method 400 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

In some embodiments described herein, one or more elements may include the use of a special purpose or general purpose computing system. For example, a computing system may be used to control operations related to generating the bit streams described herein, controlling the light sources, or any other suitable operations. The computing system may include hardware, software, or a combination of both.

Figure 5:
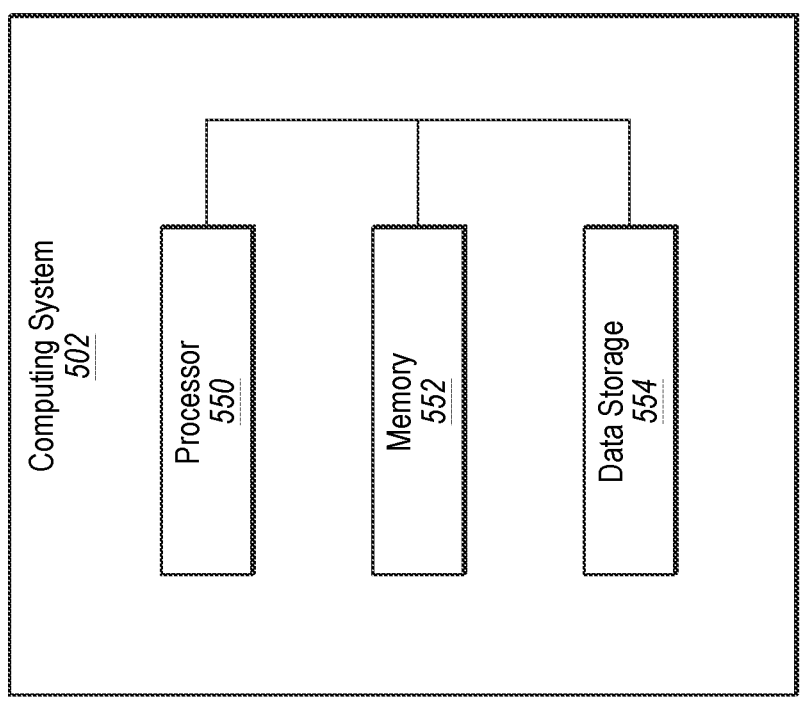
FIG. 5 illustrates a block diagram of an example computing system, all arranged in accordance with some embodiments of the present disclosure.

FIG. 5 illustrates a block diagram of an example computing system 502, according to at least one embodiment of the present disclosure. The computing system 502 may be configured to implement or direct one or more suitable operations described in the present disclosure. The computing system 502 may include a processor 550, a memory 552, and a data storage 554. The processor 550, the memory 552, and the data storage 554 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 550 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, the processor 550 may include any number of processors configured to, individually or collectively, perform or direct performance of any number of operations described in the present disclosure. Additionally, one or more of the processors may be present on one or more different electronic devices, such as different servers.

In some embodiments, the processor 550 may be configured to interpret and/or execute program instructions and/or process data stored in the memory 552, the data storage 554, or the memory 552 and the data storage 554. In some embodiments, the processor 550 may fetch program instructions from the data storage 554 and load the program instructions in the memory 552. After the program instructions are loaded into memory 552, the processor 550 may execute the program instructions.

The memory 552 and the data storage 554 may include computer-readable storage media for carrying or having computer-executable instructions or data structures stored thereon. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007).

Combinations of the above may also be included within the scope of computer-readable storage media. Computer-executable instructions may include, for example, instructions and data configured to cause the processor 550 to perform a certain operation or group of operations.

Modifications, additions, or omissions may be made to the computing system 502 without departing from the scope of the present disclosure. For example, in some embodiments, the computing system 502 may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   receiving a light wave generated by a single light source;
   generating a pumping wave by performing polarization modulation on the received light wave based on a bit stream that switches between a bit value of "0" and a bit value of "1" for every bit period of the bit stream, the pumping wave including:
      a first polarization component having a first polarization; and
      a second polarization component having a second polarization and having a same wavelength as the first polarization component, and
      the performing of the polarization modulation including changing a polarization of the light wave between the first polarization and the second polarization based on the bit values of the bit stream such that the pumping wave alternates between the first polarization and the second polarization for every bit period of the bit stream; and
   emitting the pumping wave in an optical medium such that the pumping wave amplifies an optical signal propagating within the optical medium.

2. The method of claim 1, wherein the bit period of a bit period of the bit stream is half a period of a signal pulse of the optical signal or less than half the period of the signal pulse.

3. The method of claim 1, wherein a signal power of the light wave prior to the polarization modulation of the light wave is double a signal power of each of the first polarization component and the second polarization component.

4. The method of claim 1, wherein performing the polarization modulation includes:
splitting the light wave into a first wave and a second wave;
performing amplitude modulation on the first wave based on the bit stream to generate a first modulated wave;
performing amplitude modulation on the second wave based on the bit stream to generate a second modulated wave;
offsetting the first modulated wave with respect to the second modulated wave by a period of a bit of the bit stream;
changing a polarization of the first modulated wave into the first polarization to generate the first polarization component;
changing a polarization of the second modulated wave into the second polarization to generate the second polarization component; and
combining the first polarization component and the second polarization component to generate the pumping wave.

5. The method of claim 1, wherein the bit stream is different from a data stream carried by the optical signal.

6. The method of claim 1, wherein the first polarization component is offset from the second polarization component by a period of a bit of the bit stream.

7. The method of claim 1, wherein a signal power of the pumping wave alternates between the first polarization and the second polarization every "t" seconds to generate the first polarization component and the second polarization component.

8. The method of claim 7, wherein "t" corresponds to a bit period of the bit stream.

9. A system comprising:
a single light source configured to generate a light wave; and
a polarization modulator configured to:
receive the light wave;
generate a pumping wave by performing polarization modulation on the light wave, as received from the single light source, based on a bit stream that switches between a bit value of "0" and a bit value of "1" for every bit period of the bit stream,
the pumping wave including:
a first polarization component having a first polarization; and
a second polarization component having a second polarization and having a same wavelength as the first polarization component; and
the performing of the polarization modulation including changing a polarization of the light wave between the first polarization and the second polarization based on the bit values of the bit stream such that the pumping wave alternates between the first polarization and the second polarization for every bit period of the bit stream and
emit the pumping wave in an optical medium such that the pumping wave amplifies an optical signal propagating within the optical medium.

10. The system of claim 9, wherein the bit period of the bit stream is half a period of a signal pulse of the optical signal or less than half the period of the signal pulse.

11. The system of claim 9, wherein a signal power of the light wave prior to the polarization modulation of the light wave is double a signal power of each of the first polarization component and the second polarization component.

12. The system of claim 9, wherein the polarization modulator includes:
an optical coupler configured to split the light wave into a first wave and a second wave;
a first amplitude modulator configured to perform amplitude modulation on the first wave based on the bit stream to generate a first modulated wave;
a second amplitude modulator configured to perform amplitude modulation on the second wave based on the bit stream to generate a second modulated wave, wherein the first modulated wave is offset with respect to the second modulated wave by a period of a bit of the bit stream; and
a polarization combiner configured to:
change a polarization of the first modulated wave into the first polarization to generate the first polarization component;
change a polarization of the second modulated wave into the second polarization to generate the second polarization component; and
combine the first polarization component and the second polarization component to generate the pumping wave.

13. The system of claim 9, wherein the bit stream is different from a data stream carried by the optical signal.

14. The system of claim 9, wherein the first polarization component is offset from the second polarization component by a period of a bit of the bit stream.

15. The system of claim 9, wherein a signal power of the pumping wave alternates between the first polarization and the second polarization every "t" seconds to generate the first polarization component and the second polarization component.

16. The system of claim 15, wherein "t" corresponds to a bit period of the bit stream.

* * * * *